United States Patent
Parris et al.

(10) Patent No.: US 11,107,604 B2
(45) Date of Patent: Aug. 31, 2021

(54) CABLE OR FLEXIBLE PIPE WITH IMPROVED TENSILE ELEMENTS

(71) Applicant: Prysmian S.p.A, Milan (IT)

(72) Inventors: Donald Ray Parris, Milan (IT); Massimo Bechis, Milan (IT)

(73) Assignee: Prysmian S.p.A, Milan (IT)

( * ) Notice: Subject to any disclaimer, the term of this patent is extended or adjusted under 35 U.S.C. 154(b) by 0 days.

(21) Appl. No.: 16/484,092

(22) PCT Filed: Feb. 8, 2017

(86) PCT No.: PCT/EP2017/052711
§ 371 (c)(1),
(2) Date: Aug. 6, 2019

(87) PCT Pub. No.: WO2018/145736
PCT Pub. Date: Aug. 16, 2018

(65) Prior Publication Data
US 2019/0378635 A1    Dec. 12, 2019

(51) Int. Cl.
| | |
|---|---|
| *H01B 7/02* | (2006.01) |
| *H01B 7/18* | (2006.01) |
| *D07B 1/00* | (2006.01) |
| *F16L 11/08* | (2006.01) |
| *H01B 7/04* | (2006.01) |
| *F16L 33/01* | (2006.01) |

(52) U.S. Cl.
CPC .............. *H01B 7/182* (2013.01); *D07B 1/005* (2013.01); *F16L 11/083* (2013.01); *H01B 7/045* (2013.01); *H01B 7/1875* (2013.01); *F16L 33/01* (2013.01)

(58) Field of Classification Search
CPC ... H01B 7/02; H01B 7/04; H01B 7/06; H01B 7/182; H01B 7/1875; H01B 7/045
USPC .. 174/102 R, 107, 108, 109, 102 SC, 102 E, 174/112, 113 R, 115, 117 R, 117 FF, 174/120 R
See application file for complete search history.

(56) References Cited

U.S. PATENT DOCUMENTS

| | | | |
|---|---|---|---|
| 3,328,140 A | 6/1967 | Warren | |
| 3,717,720 A * | 2/1973 | Snellman | H01B 5/105 174/131 A |
| 3,980,808 A | 9/1976 | Kikuchi et al. | |
| 5,554,826 A * | 9/1996 | Gentry | H01B 5/104 174/128.1 |

(Continued)

FOREIGN PATENT DOCUMENTS

| | | | |
|---|---|---|---|
| EP | 0293263 A1 * | 5/1988 | D02G 3/48 |
| EP | 1 867 906 A1 | 12/2007 | |

(Continued)

OTHER PUBLICATIONS

Furugen et al., "Completion of Submarine Cable Lines Combining Low Environmental Impact with Low Cost," *Furukawa Review No. 21*, pp. 44-49, 2002.

*Primary Examiner* — William H. Mayo, III
(74) *Attorney, Agent, or Firm* — Seed IP Law Group LLP

(57) ABSTRACT

A cable includes an elongated tensile element having a cross section area and including a fibre reinforced polymer composite core having an elastic modulus of at least 70 GPa and a sheath at least partially covering the composite core. The sheath is made of metal and is at least 30% of the cross section area of the tensile element.

20 Claims, 6 Drawing Sheets

(56) References Cited

U.S. PATENT DOCUMENTS

| | | | | |
|---|---|---|---|---|
| 6,559,385 B1* | 5/2003 | Johnson | H01B 5/105 | 174/126.1 |
| 6,563,054 B1* | 5/2003 | Damien | D07B 1/165 | 174/120 C |
| 7,093,416 B2* | 8/2006 | Johnson | H01B 5/105 | 57/212 |
| 7,179,522 B2* | 2/2007 | Hiel | H01B 5/105 | 174/102 R |
| 7,763,802 B2* | 7/2010 | Varkey | H01B 7/046 | 174/106 R |
| 9,093,194 B2* | 7/2015 | McCullough | H01B 7/14 | |
| 9,851,027 B2* | 12/2017 | Anelli | F16L 11/083 | |
| 2003/0124377 A1* | 7/2003 | McCullough | C04B 41/009 | 428/611 |
| 2004/0020681 A1* | 2/2004 | Hjortstam | B82Y 30/00 | 174/102 SC |
| 2004/0066035 A1 | 4/2004 | Buon et al. | | |
| 2005/0181228 A1* | 8/2005 | McCullough | C22C 47/08 | 428/611 |
| 2006/0102377 A1* | 5/2006 | Johnson | H01B 5/105 | 174/108 |
| 2006/0137880 A1* | 6/2006 | Figenschou | E21B 17/203 | 166/367 |
| 2006/0231286 A1* | 10/2006 | Varkey | H01B 7/1895 | 174/113 R |
| 2007/0000682 A1* | 1/2007 | Varkey | D07B 1/147 | 174/102 R |
| 2007/0044991 A1* | 3/2007 | Varkey | D07B 7/145 | 174/102 R |
| 2007/0044992 A1* | 3/2007 | Bremnes | F16L 53/37 | 174/102 R |
| 2007/0237469 A1* | 10/2007 | Espen | H01B 7/14 | 385/100 |
| 2009/0194314 A1* | 8/2009 | Varkey | H01B 7/046 | 174/103 |
| 2010/0038112 A1* | 2/2010 | Grether | D07B 1/02 | 174/128.1 |
| 2010/0054677 A1* | 3/2010 | Figenschou | H01B 7/045 | 385/101 |
| 2010/0293783 A1* | 11/2010 | Goldsworthy | G02B 6/255 | 29/825 |
| 2011/0174519 A1* | 7/2011 | Shah | H01B 3/004 | 174/119 C |
| 2012/0090892 A1* | 4/2012 | Meyer | H01B 5/105 | 174/99 R |
| 2012/0222869 A1* | 9/2012 | Varkey | D07B 1/147 | 166/385 |
| 2015/0113936 A1* | 4/2015 | Amils | D07B 1/0686 | 57/216 |
| 2015/0294763 A1* | 10/2015 | Varkey | G02B 6/4416 | 385/101 |
| 2016/0176380 A1* | 6/2016 | Demeritte | B60R 22/48 | 340/687 |
| 2016/0265339 A1* | 9/2016 | Xia | H01B 7/046 | |
| 2017/0133124 A1* | 5/2017 | Thomas | E21B 17/00 | |
| 2018/0366240 A1* | 12/2018 | Varkey | H01B 7/285 | |

FOREIGN PATENT DOCUMENTS

| | | | | |
|---|---|---|---|---|
| WO | 2010/075873 A1 | 7/2010 | | |
| WO | 2012/076017 A1 | 6/2012 | | |
| WO | 2014/053601 A1 | 4/2014 | | |
| WO | WO 2015/004597 A1 * | 7/2014 | | F16L 11/08 |
| WO | 2015/004597 A1 | 1/2015 | | |

* cited by examiner

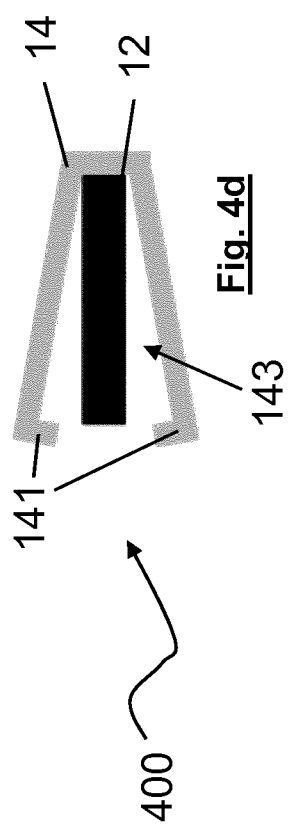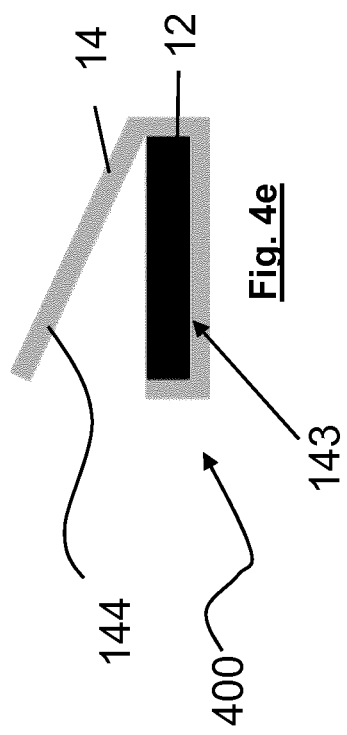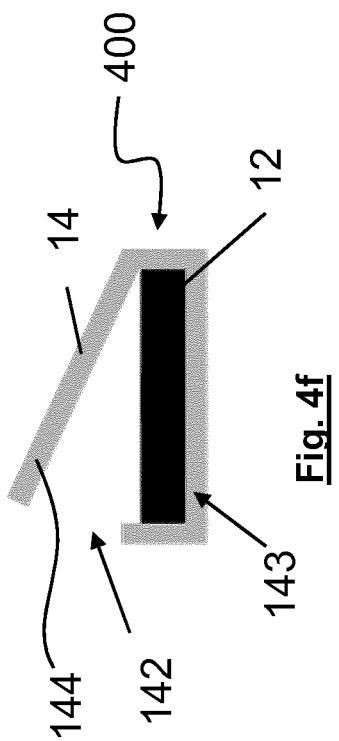

CABLE OR FLEXIBLE PIPE WITH IMPROVED TENSILE ELEMENTS

BACKGROUND

The present invention relates to the field of cables and flexible pipes, in particular for submarine applications and more in particular for submarine applications in deep water. In particular the present invention relates to a cable or a flexible pipe with improved tensile elements.

PRIOR ART

Optical cables, power cables, umbilical cables, flexible pipes for submarine applications are well known in the art. In particular, flexible pipes comprise a tube for safely transporting a fluid, such as crude oil or gas, in a confined manner.

For the purpose of the present invention, unless otherwise specified, the terms "submarine cable", "cable for sub-sea applications" (or any similar language) or simply "cable" will include an elongated flexible element configured to transport power and/or telecommunication signals and/or one or more fluids. For the purpose of the present invention, the term "cable" will include, for instance, power cable, optical cable, flexible tube for transporting a fluid or any combination thereof.

The present invention is not limited to cables for submarine application and can be applied to other fields where tensile strength and lightweight are of importance. For instance, lightweight is appealing in cables for elevators or the like, especially when installed in very high buildings.

During installation and performance, cables and flexible pipes should sustain high tensile loads. For example, a submarine cable or a pipe hangs off of the installation vessel from the surface of the water to the floor of the sea with a consequent substantial tensile stress.

It is known to provide tensile strength by the use of steel tensile members placed axially or, more frequently, in a stranded arrangement around the cable or pipe structure to form an armour, as shown for example, in WO 2015/004597 and WO 2010/075873.

Tensile strength elements made of steel represent an important portion of the cable weight. The cable weight sets the limit for the deposition depth of a submarine cable because the deeper the water, the longer is the cable span (and, accordingly, the cable weight) that is "hanging" from the installation vessel. A given cable weight can cause a substantial cable elongation (e.g. greater than 0.5%) likely to damage to the cable itself. For current steel-strengthened submarine cables, the deposition depth limit is around 2000 meters.

In addition, the payoff system of the installation vessel has to be commensurate to the weight of the cable to be deployed. The heavier the cable is, the stronger the gripping force of the payoff system needs to be. As the gripping force increases, the compression resistance of the cable also has to increase. Crush failure caused by gripping is a known mode of failure.

Tensile elements made of polymeric material, in particular of fibre composite material (e.g. FRP), have been proposed.

For example, WO 2012/076017 relates to a method of producing curved, elongate fibre reinforced polymer element suitable for flexible pipe. The method comprises impregnating a fibre bundle with a mouldable, curable impregnation substance. The impregnated fibre bundle is further provided with a coating of thermoplastic material.

Furugen M. et al., Furukawa Review No. 21, 2002 illustrates a submarine cable with double armour and the compound armour consisted of high-density polyethylene sheathed FRP (fiberglass-reinforced plastic) as the first layer.

U.S. Pat. No. 3,980,808 relates to an electric cable having a fibre reinforced plastic reinforcing member applied for imparting various mechanical strengths.

Applicant observed that tensile elements made of a fibre composite material coated with a polymeric material cannot be plastically deformed without losing or decreasing in functionality. They can only be substantially elastically deformed.

The plastic deformation is especially sought when the tensile members are plastically deformed in end fittings in order to obtain a strong bond between the end fitting and the cable.

Methods for securing an end fitting to a cable tensile element are disclosed, for example, in EP 1 867 906 and US 2004/066035 where the tensile elements are curved to even very small bending diameter.

In addition, cable armour is generally made of elongated tensile elements wound around the cable core with a certain lay length. If the elongated tensile elements are wholly made of polymeric material, their substantial lack of plastic deformation can also cause problems at the cable ends where, free from constrain, the element can straighten and unwind, causing problems in the cable handling.

SUMMARY OF THE INVENTION

The Applicant has tackled the problem of providing a submarine cable configured for installations exerting a considerable tensile stress on the cable, and, more in general, the problem of having a lighter cable which is felt in vertical installations like those for elevator cables.

In the case of submarine cables, installations at high depths, for instance at depths of about 2000 m or more are sought.

In particular, the Applicant has faced the problem of providing a tensile member for a submarine cable configured for installations at high depths which could contribute to limit the elongation of the cable during installation, provide sufficient compression (crush) resistance, as required by the gripping equipment used for the cable deployment at the desired sea depth, and can be suitably plastically deformed for the connection to end fittings.

The Applicant has investigated tensile element designs made of composite materials and has noted that the use of polymeric materials reduces weight and/or increases the strength of a tensile element.

On the other side, metals are plastically deformable with little or no decrease in functionality and, compared to composites, are in general more durable and better withstand rougher handling, impacts and abrasions. They are more manufacturing friendly.

The Applicant found that a tensile strength element suitable for coupling with the end fittings and for high tensile applications of cables, umbilicals, flexible pipes) can conveniently be made of a polymer/fibre composite partially or entirely sheathed by a metal sleeve.

In particular, it has been found that a tensile strength element comprising a predetermined amount of metal and a polymer/fibre composite having a given elastic modulus is effective for providing a cable with suitable plastic deformation and crush resistance for end fitting and suitable tensile strength for the cable to be deployed at high depths (or otherwise bearing significant loads).

According to a first aspect, the present invention provides a cable comprising an elongated tensile element having a cross section area and comprising a fibre reinforced polymeric composite core having an elastic modulus of at least 70 GPa and a sheath at least partially covering the composite core, the sheath being made of metal and being at least 30% of the cross section area of the tensile element.

A cable of the invention preferably comprises a plurality of elongated tensile elements disposed in one or more armour layers to provide an armour. The plurality of elongated tensile elements is advantageously wound around the longitudinal cable axis. When the plurality of elongated tensile elements is provided in more layers the winding direction of one layer is preferably opposite to that of the adjacent layer.

The elongated tensile elements of the invention can have a cross-section of any shape, for example round, square or flat (such as rectangular or oval) having a minor and a major axis. A flat cross-section is preferable as an armour made of flat elongated tensile elements (with the main axis of the cross-section arranged circumferentially around the cable axis) is more compact and the longitudinal axis of the single elements remains closer to the main axis of the cable.

When the elongated tensile element of the cable of the invention has a flat cross section, the fibre reinforced polymeric composite core has a thickness of at most 80% of the thickness of the tensile element along its minor axis.

Advantageously, in an elongated tensile element having a flat cross section, the fibre reinforced polymeric composite core is provided substantially centred on the neutral bending axis of the tensile element. This positioning of the fibre reinforced composite core causes less stress on the composite material when the elongated tensile element is deformed for being connected to end-fittings.

The fibre reinforced composite polymer can be selected from carbon fibres, aramid fibres or glass fibres or a combination thereof.

The fibres of the reinforced composite polymer are embedded in a polymeric matrix, for example a thermoset matrix (e.g. an epoxy resin such as bisphenol A epoxy vinylester; a polyester or a vinyl ester resin) or a thermoplastic matrix (e.g. a polyester or a polyamide). While a fibre reinforced polymeric composite with a thermoplastic matrix generally has lower strength to weight ratios than a composite with thermoset matrix, a thermoplastic matrix material may offer higher impact resistance, which is desirable against crush failure in some circumstances.

Advantageously, the fibre reinforced polymer composite core has a longitudinal axes and fibres embedded in a polymeric matrix with longitudinal axes substantially parallel to the longitudinal axis of the fibre reinforced polymer composite core.

When the fibre reinforced polymeric composite comprises a conductive component (e.g. carbon fibres) a film of thermoset or thermoplastic coating can be provided around the fibre reinforced composite polymer as electrically insulating layer suitable for preventing any potential galvanic coupling between the metallic sheath and a conductive component of the composite polymer. Galvanic coupling could cause corrosion in the metallic sheath.

In the present description and claims, as "elastic modulus" it is meant a measure of the stiffness of a solid material, in particular the ratio of the stress (force per unit area) along an axis to the strain (ratio of deformation over initial length). It is also known as Young's modulus.

The elastic modulus of the fibre reinforced polymer composite for the elongated tensile element of the invention is preferably of at least 100 GPa, more preferably up to 300 GPa. Greater elastic modulus could result in an elastic return or springback after deformation too strong to be restrained by the metal sheath, especially when very small bending diameter (of 100 mm or less) is required.

The sheath of the invention is preferably made of steel. Steel suitable for the present invention has an elastic modulus of from 150 to 250 GPa.

The metal sheath advantageously extends substantially along the full length of elongated tensile element.

Preferably, the metal sheath continuously covers the composite core all along its length.

The metal sheath of the elongated tensile elements for the cable of the invention represents at least 30% of the cross section area of the tensile element. Such percentage may vary depending on the elastic modulus of the fibre reinforced polymeric composite used in the core of the element and of the bending diameter required for the elongated tensile element to be end-fitted.

The metal sheath of the elongated tensile elements for the cable of the invention can represent up to 85% of the cross section area of the tensile element. This upper limit is selected in view of the sought deployment depth of the cable and, accordingly, of the overall cable weight (where the less amount of metal in the elongated tensile element is, the better is) and of the plastic deformation and crush resistance exerted at the end fitting (where the more amount metal in the elongated tensile element is the better is).

The fibre reinforced polymeric composite core and a metal sheath are in direct contact one another or, preferably, an adhesive layer is interposed in between.

The sheath and the core are preferably bound together by an adhesive and/or by a mechanical (pressure) bond.

The cable can be an optical cable, a power cable, an umbilical cable or a flexible pipe. Preferably, the cable is for submarine application or for long vertical deployment, like cables for elevators.

Advantageously, the metal sheath of the elongated tensile elements has a longitudinal welded seam.

Preferably, the metal sheath is made of a sheet shaped to form an open housing with edges welded together after the core has been inserted in the housing.

BRIEF DESCRIPTION OF THE DRAWING

The present invention will become fully clear by reading the following detailed description, to be read by referring to the accompanying drawings, wherein:

FIGS. 4a to 4f are diagrammatic cross-sections of elongated tensile elements according to some embodiments of the present invention.

DESCRIPTION OF EXAMPLES

In the present description and claims, unless otherwise specified, all the numbers and values should be intended as preceded by the term "about".

The present invention relates to an elongated tensile element for a cable and a cable comprising such an elongated tensile member. More specifically, the elongated tensile element is configured for making an armour of any of an optical cable, a power cable, an umbilical cable, a flexible pipe or similar elongated object requiring a tensile strength element, in particular, but not only, for submarine applications. The present invention also includes an optical cable, power cable, umbilical cable, flexible pipe (or the like) in particular, but not only, for submarine applications comprising one or more elongated tensile elements. The elongated tensile elements can form a cable armour.

Figure 1:
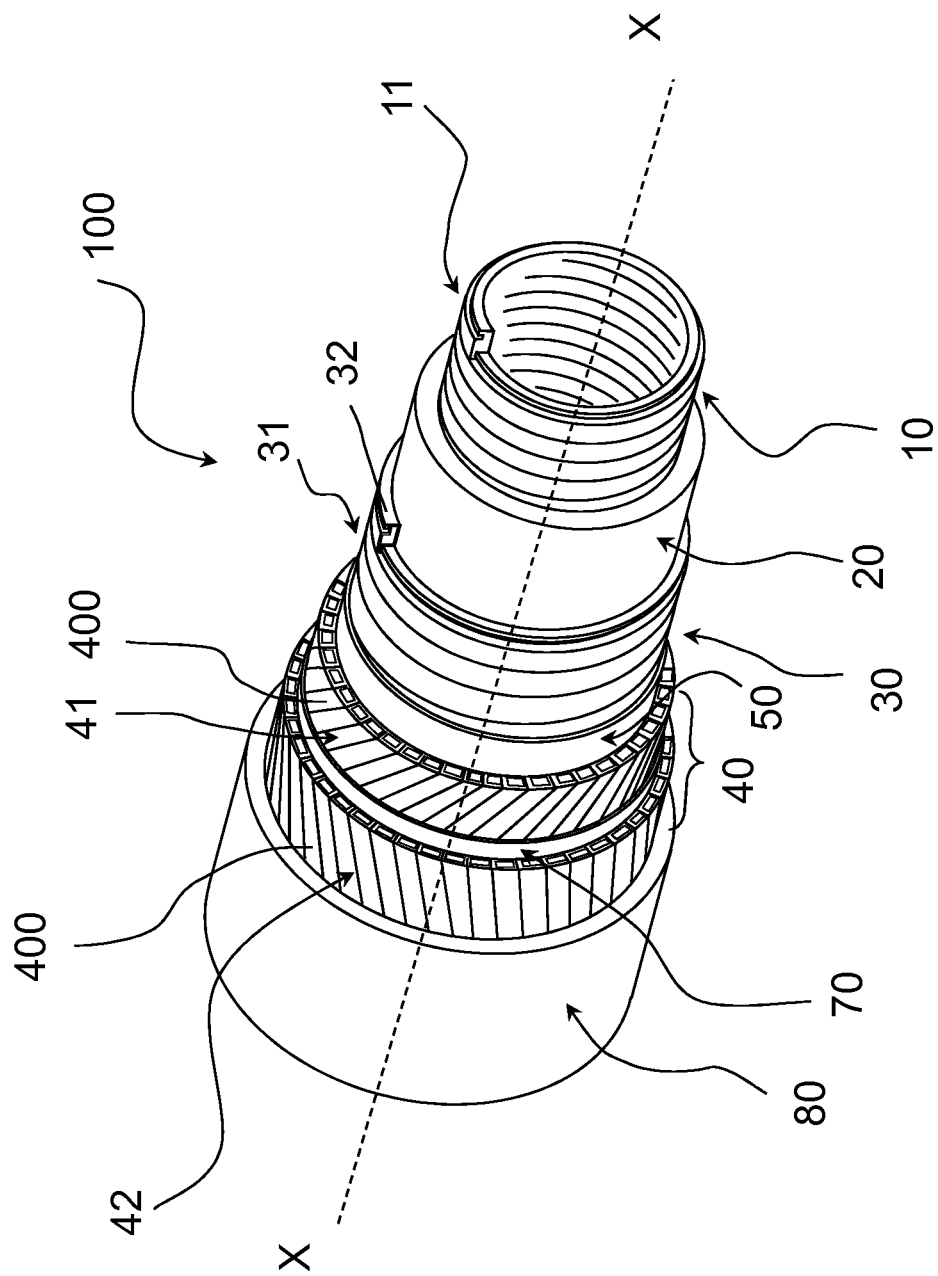
FIG. 1 is an axonometric view of a flexible pipe for transporting crude oil comprising an armour structure comprising a plurality of elongated tensile elements.

A flexible pipe is shown in FIG. 1. FIG. 1 is an axonometric view of a submarine flexible pipe 100 for transporting a fluid such as crude oil. The pipe 100 comprises, in a radially inner position thereof, a metal flexible carcass 10, configured to operate in contact with the crude oil (or other fluid) to be transported. The carcass 10 comprises a helical winding 11 of a stainless steel elongated element.

The pipe 100 further comprises, in a radially outer position with respect to the carcass 10, an inner polymeric liner 20 configured to prevent leakages of the fluid out of the carcass 10. The polymeric material of the liner 20 is preferably selected from the group comprising: polyamide, polyvinylidene fluoride, polyethylene, cross-linked polyethylene.

The pipe 100 further comprises, in a radially outer position with respect to the inner polymeric liner 20, a mechanical armour structure which is potentially exposed to water contact. The mechanical armour structure comprises a pressure resistant armour 30 configured to withstand to radial loads and a tensile armour 40. The pressure resistant armour 30 is formed from one or more short-pitch helical winding 31 of an interlocked profiled carbon steel elongated element 32. A layer 50 of plastic material is arranged between the pressure resistant armour 30 and the tensile armour 40.

As shown in FIG. 1, the tensile armour 40 is arranged in a radially outer position with respect to the pressure resistant armour 30. The tensile armour 40 is configured to withstand to the longitudinal tensile forces which the pipe 100 may be subjected to in operation. The tensile armour 40 comprises a first tensile armour layer 41 and a second tensile armour layer 42 of long-pitch helical windings of elongated tensile elements 400 extending parallel to each other in a helix coaxial with the pipeline longitudinal axis X-X.

The helical windings of the second tensile armour layer 42 extend along a winding direction which is opposite to the winding direction of the helical windings of the first tensile armour layer 41 with respect to the longitudinal axis X-X, so as to define a crossed configuration. Preferably, the helical windings of the first and second tensile armour layers 41 and 42 are laid with substantially the same pitch, in opposite directions, so as to prevent pipe rotation under axial load. The elongated tensile elements 400 are laid, preferably, with winding pitch comprised between 25 cm and 200 cm. The elongated tensile elements 400 of the tensile armour 40 are arranged side by side and have a substantially rectangular cross section, as it will be detailed in any of the following FIGS. 4a-4f.

A layer 70 of polymeric material is arranged between the first tensile armour layer 41 and the second tensile armour layer 42.

The pipe 100 further comprises, in a radially outer position with respect to the radially second tensile armour layer 42, a protective polymeric outer sheath 80 aimed to be waterproof.

Figure 2:
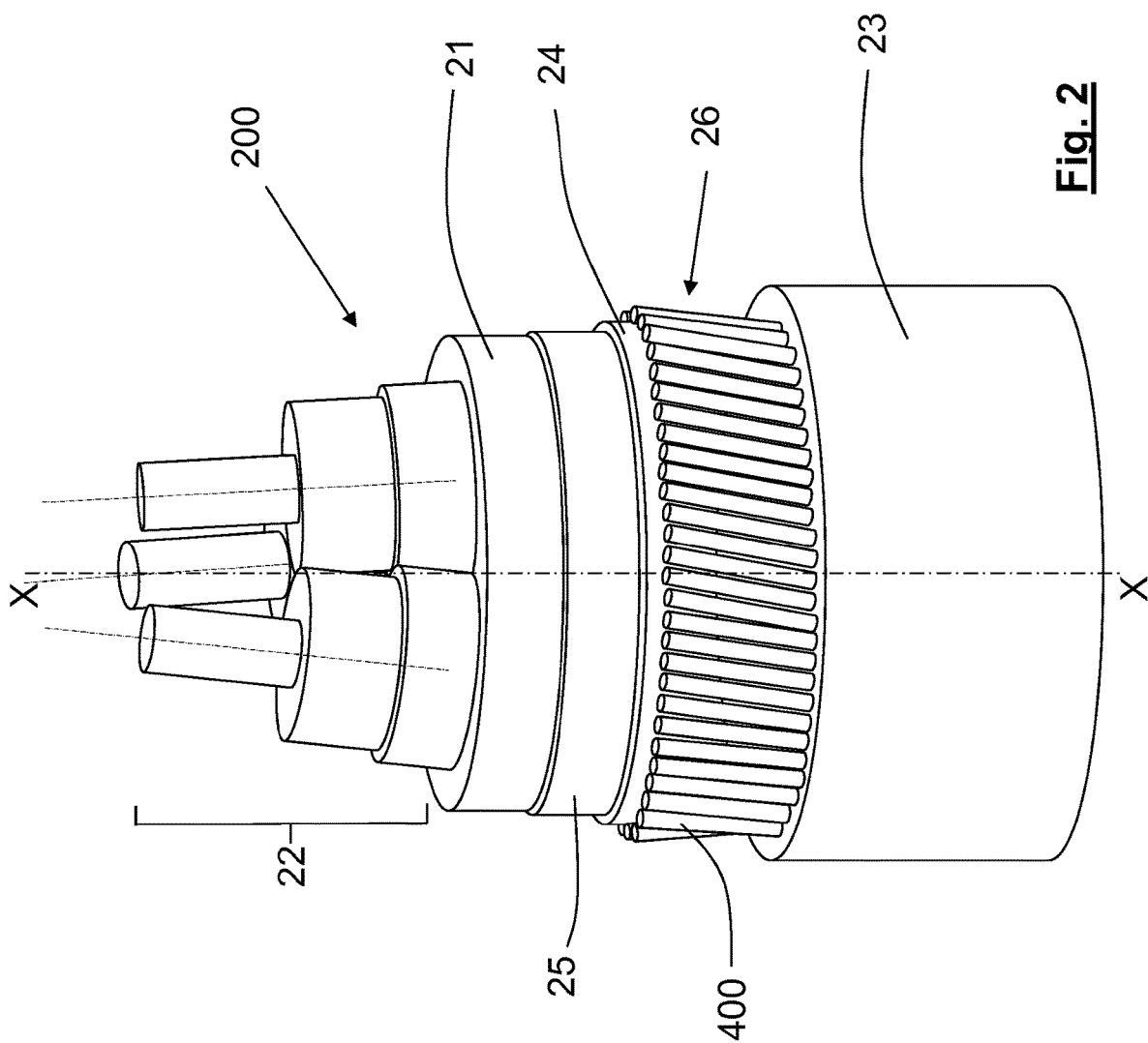
FIG. 2 is an axonometric view of an armoured three-core power cable.

FIG. 2 shows an armoured three-core power cable 200 suitable for submarine deployment. Cable 200 comprises three stranded insulated conductive cores 22 surrounded by a bedding/sheath system 21. A cushioning layer 25 (made, for example, of polypropylene yarns) surrounds the bedding/sheath system 21. Around the cushioning layer 25 a tensile armour 26, comprising at least one layer of elongated tensile elements 400 according to the invention, is provided. A protective polymeric outer sheath 23 surrounds the armour 26. The tensile armour 26 is configured to withstand to the longitudinal tensile forces which the power cable 200 may be subjected to in operation. The elongated tensile elements 400 preferably extend parallel to each other in a helix coaxial with the cable longitudinal axis X-X. While the tensile elements 400 of FIG. 2 have a circular cross-section, they can also have a substantially rectangular cross-section, as it will be detailed in any of the following FIGS. 4a-4f.

Figure 3:
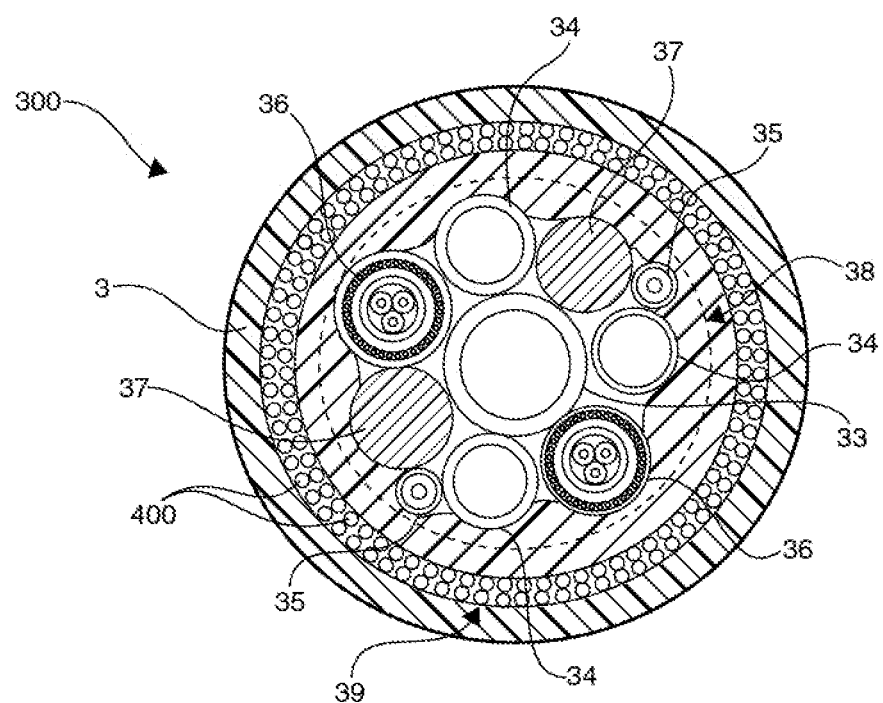
FIG. 3 is a cross section of an umbilical cable

FIG. 3 is a cross-section of an umbilical cable 300. This umbilical cable 300 comprises a central core 33. The central core 33 may be made of steel for transporting a fluid. Disposed around the central core 33 are three steel tubes 34 for transporting a fluid; two optical fibre cables 35; two armoured electric power cable 36; two thermoplastic fillers 37; and a sheath 38. Around the sheath 38 two layers of counter-helically wound elongated tensile elements 400 according to the invention are provided. The two layers of elongated tensile elements 400 constitute the tensile armour 39 of the umbilical cable 300. An outer sheath 3 surrounds the tensile armour 39. Outer sheath 3 may be made, for example, of polymeric material. While the tensile elements 400 shown in FIG. 3 have a circular cross-section, they can also have a substantially rectangular cross-section, as it will be detailed in any of the following FIGS. 4a-4f.

The elongated tensile element of the present invention is designed to replace the known elongated elements made, for example, of carbon steel, in order to provide improved installation performance while maintaining the beneficial characteristics of carbon steel tensile members.

The elongated tensile elements of the present invention can be adopted in the flexible pipe of FIG. 1, in any of cables of FIGS. 2 and 3 or in any other different design where tensile strength is an issue.

According to embodiments of the present invention, there is provided a cable comprising a reinforcing structure with one or more elongated tensile elements, wherein each elongated tensile element comprises a core and a metal sheath at least partially sheathing said core, wherein the core comprises a fibre reinforced polymeric composite material.

Figure 5:
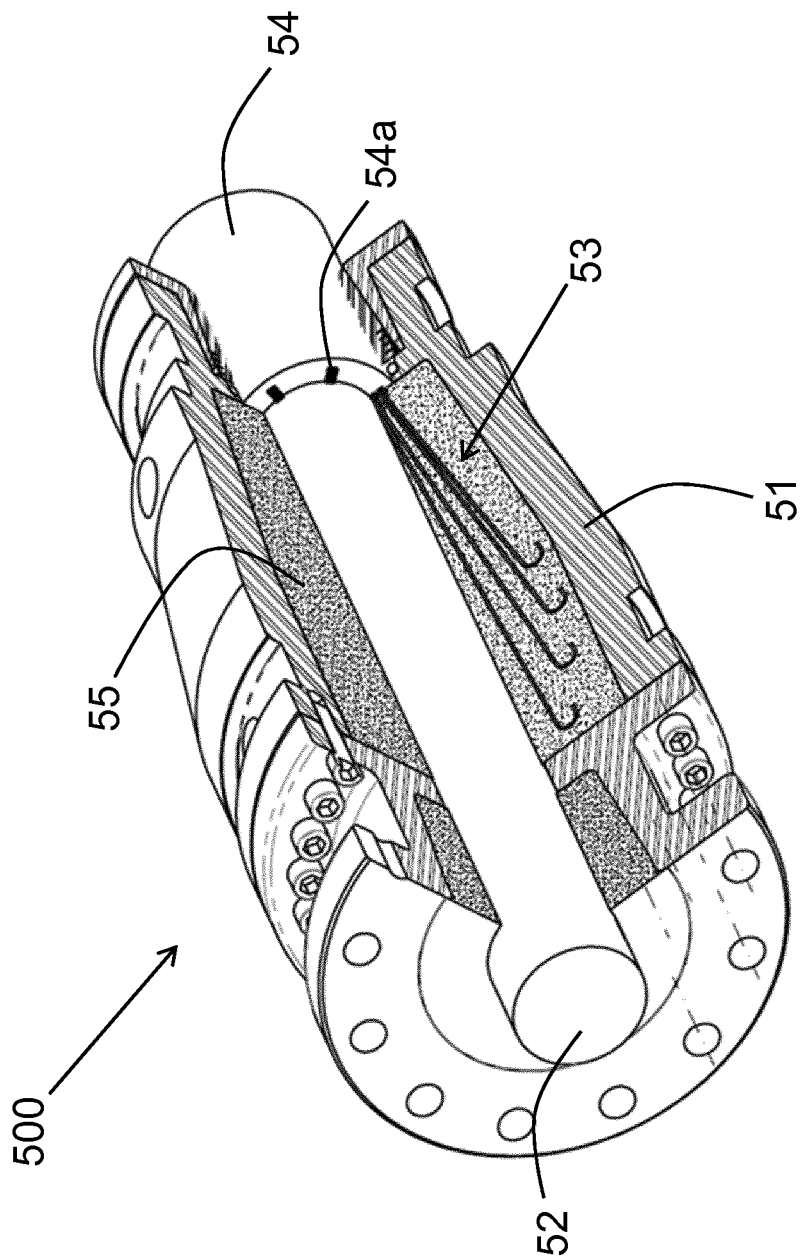
FIG. 5 shows an example of end-fitting known in the art.

FIG. 5 shows an example of end-fitting, in particular a portion of end fitting is schematically illustrated. The end-fitting 500 comprises a cylindrical body 51 where a portion 52—specifically the portion underlying the armour—of a cable is inserted through a flange 54. Before the insertion, the elongated tensile elements 53 of the cable armour are unwound, diverted from the underlying cable portion 52 and passed through the holes 54a of the flange 54. Once positioned within the cylindrical body 51, the terminal portion of the elongated tensile elements 53 is suitably bent, and a thermoset resin 55 is injected to fill the cylindrical body 51.

The possibility of plastically deforming the elongated tensile elements 53 is advantageous both in the step of diverting them from the cable portion 52 and in the step of injecting the thermoset resin 55 to embed the bent terminal portion of the elongated tensile elements 53.

According to embodiments of the present invention, the elongated tensile element has a core of composite material and is at least partially covered by a metal sheath being at least 30% of the cross section area of the tensile element. FIGS. 4a to 4f schematically show some different constructions of elongated tensile elements of the invention through cross-sections. While the Figures only show substantially flat tensile elements 10 having a substantially rectangular cross-section, the present invention is not limited to such designs.

Figure 4A:
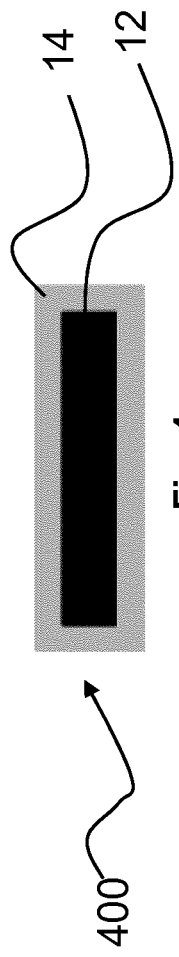
Figure 4B:
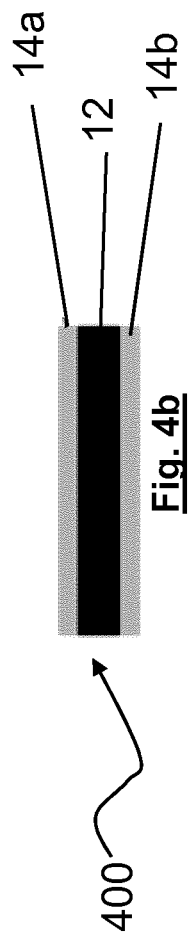
Figure 4C:
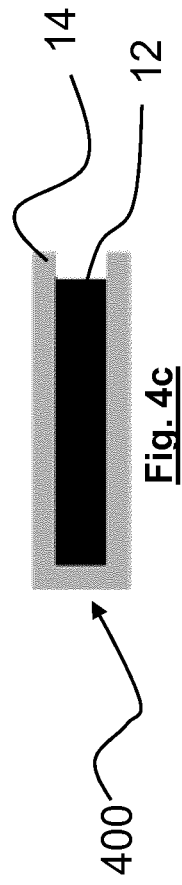

FIGS. 4a to 4c show elongated tensile elements 10 with the core of composite material totally (FIG. 4a) or partially (FIGS. 4b and 4c) covered by a metal sheath. In particular, in FIG. 4a the composite core 12 is completely enclosed in a tubular metal sheath 14 covering both the major faces and the minor faces of the rectangular core 12.

The closed tubular metal sheath 14 can be connected to the core 12 by any known means, either mechanical or chemical (for instance, respectively, by compression of the metal sheath against the composite core or by an adhesive or the like interposed between metal sheath and composite core). Examples of adhesives suitable for the present invention include solvent based adhesive, hot-melt adhesive, cyanoacrylates, polyurethanes, epoxies, contact adhesives, pressure sensitive adhesives. The adhesive connection is preferable also because it can be implemented in a continuous process. In addition, the shear forces created by an adhesive would better couple the two element components (the metal layer and the composite core) together to provide reliable tensile performance.

According to the embodiment of FIG. 4b, the composite core 12 of the tensile element 400 is sandwiched between a first metal layer 14a and a second metal layer 14b substantially covering the major faces of the core 12.

The elongated tensile elements 400 can have a substantially circular or a flat (rectangular or oval) cross-section. In the case of a flat cross-section, the cross-section major axis is preferably oriented tangentially with respect to the cable circumference. For example, the cross-section major axis can be from 5 mm to 20 mm long, and the cross-section minor axis can be from 2 mm to 5 mm long. In the case of circular cross-section, the elongated tensile elements 400 can have a diameter of from 2 to 20 mm.

The thickness of the sheath 14 is it least 30% of the cross section area of the tensile element.

An elongated tensile element 400 according to FIG. 4b might be formed by roll forming or by any other continuous forming method. The first metal layer 14a and the second metal layer 14b can be made of carbon steel having an elastic modulus of 200 GPa, and can have the thickness already mentioned for sheath 14.

The first and second layers of steel 14a and 14b can be connected to the core 12 by any known means, either mechanical or chemical, as already mentioned above (for instance through an adhesive or the like). In addition, the shear forces created by an adhesive would couple the two elements (the two layers 14a and 14b of steel and the composite core 12) together to provide reliable tensile performance.

According to the embodiment of FIG. 4c, the composite core 12 is partially covered by a "C" shaped sheath 14 of steel. Therefore, in addition to the major faces of the core 12 which become covered by a layer of steel, also one of the minor faces becomes steel sheathed. One side remains open. From such an opening, it is possible to insert the composite core 12 either during or after the forming step of the C-shaped sheath.

FIGS. 4d to 4f show some methods for manufacturing an elongated tensile element 400 with the composite core 12 fully enclosed in a metal sheath 14, according to FIG. 4a.

In one embodiment, the steel sheath 14 is formed by folding a foil (for example by roll forming) to provide a tube with rectangular cross-section and with edges substantially contacting along one of the minor sides or along the border between a minor side and a major side. During manufacturing the sheath edges are elastically parted; the composite core 12 is inserted within the parted edges which are then put in contact one another again. A compression stage follows, performed onto the steel sheath 14 and, accordingly, on the core 12 of composite material enclosed within. The seam resulting from the contact between the edges can be welded.

The manufacturing embodiment of FIG. 4d can be used to make an elongated tensile element as the one of FIG. 4a. Half side segments 141 are provided at each of the free ends of a "C" shaped sheath 14. In this way, after the core 12 is inserted into the sheath 14 in its open configuration, the sheath 14 spring-closes and fully encloses the composite core 12. The two half side segments 141 form a side of the steel sheath 14. Preferably, the seam of the two half side segments 141 can be welded together.

The sheath 14 of FIG. 4e comprises a foil configured to form a housing 143 for the composite core 12 and a spring loaded lid 144. During the composite core insertion, the lid 144 is maintained open against the spring force tending to close the housing 143. Once the core has been lodged into the housing 143, the lid 144 is left free so that it elastically abuts against the composite core 12 so as to fully enclose it.

Preferably, the seam of the lid 144 is finally welded to the edge of the housing 143 to enclose the composite core 12 in a stable manner. An adhesive can be employed for connecting one or more sides of the core 12 to one or more corresponding sides of the sheath 14. As an alternative, mechanical means can be used for providing a mechanical connection between the core 12 and the sheath 14. For instance, such mechanical means can comprise small protrusions in the steel sheath penetrating the composite core.

The manufacturing embodiment of FIG. 4f is similar to the one shown in FIG. 4e. The difference is that in the embodiment of FIG. 4e the side of the housing 143 is flush with the core 12, while in the embodiment of FIG. 4d, the side of the housing 143 is projecting over the core 12. The length of the lid 144 accommodates the two embodiments, so that, the lid of FIG. 4c is longer than the lid of FIG. 4d.

As for the elongated tensile element of FIG. 4c, a suitable manufacturing process analogous to that for the element of FIG. 4a can be performed. For example, a sheath 14 as from FIG. 4d lacking of the half side segments 141 can be used.

With respect to known tensile elements made of metal only, the elongated tensile element according to the present invention has reduced dimensions and/or reduced weight and/or increased strength while retaining the advantages of manufacturing friendliness and ease of end-fitting of a metal element.

Example 1

An elongated tensile element (reference element) made of steel only has been taken as comparative element. This tensile element has a substantially rectangular cross section with dimensions of 2 mm×7 mm, an elastic modulus of 191 GPa and a density of 7.8 g/cm³.

When a length of 1,430 m of this all steel elongated tensile element was suspended vertically, its own weight (156 kg) caused an elongation of the steel tensile element itself of 0.05%.

A first elongated tensile element according to embodiments of the present invention has been tested. This tensile element had a substantially rectangular cross section and dimensions of 2 mm×7 mm, a core made of epoxy resin reinforced with carbon fibres having an elastic modulus of 150 GPa and a density of 1.6 g/cm³, and steel sheath having an elastic modulus of 191 GPa and a density of 7.8 g/cm³. The core had a substantially rectangular cross section with dimensions of 0.75 mm×6 mm, and it was totally covered by the steel sleeve representing about 68% of the elongated tensile element cross-section area.

When a length of 1,800 m of the first elongated tensile element according to the invention was suspended vertically, its own weight (146 kg) caused an elongation of the tensile element itself of 0.05%.

A second elongated tensile element according to embodiments of the present invention has been tested. This tensile element had a substantially rectangular cross section and dimensions of 2 mm×7 mm, a core made of a thermoplastic matrix reinforced with aramid fibres having an elastic modulus of 100 GPa and a density of 1.45 g/cm³, and steel sheath having an elastic modulus of 191 GPa and a density of 7.8 g/cm³. The core had a substantially rectangular cross section with dimensions of 1 mm×6 mm, and it was totally covered by the steel sheath representing about 57% of the elongated tensile element cross-section area.

When a length of 1,830 m of the second elongated tensile element according to the invention was suspended vertically, its own weight (130 kg) caused an elongation of the tensile element itself of 0.05%.

A third elongated tensile element according to embodiments of the present invention has been tested. This tensile element had a substantially rectangular cross section and dimensions of 2 mm×7 mm, a core made of a thermoset matrix reinforced with glass fibres having an elastic modulus of 70 GPa and a density of 2.4 g/cm³, and steel sheath having an elastic modulus of 191 GPa and a density of 7.8 g/cm³. The core had a substantially rectangular cross section with dimensions of 1 mm×6 mm, and it was totally covered by the steel sheath representing about 57% of the elongated tensile element cross-section area.

When a length of 1570 m of the second elongated tensile element according to the invention was suspended vertically, its own weight (121 kg) caused an elongation of the tensile element itself of 0.05%.

The above values are summarised in the below Table 1.

TABLE 1

| Elongated tensile element | Elastic Modulus [GPa] | Density [g/cm³] | Sample length providing 0.05% elongation [m] | Weight of length providing 0.05% elongation [kg] |
| --- | --- | --- | --- | --- |
| Reference | 191 | 7.80 | 1430 | 156 |
| 1ˢᵗ element | 150 | 1.6 | 1800 | 146 |
| 2ⁿᵈ element | 100 | 1.45 | 1830 | 130 |
| 3ʳᵈ element | 70 | 2.4 | 1570 | 121 |

Thanks to the fibre reinforced polymeric composite, the elongated elements of the invention reach a given percentage of elongation with a greater length than a comparative elongated element made of metal (steel) only. Accordingly, a cable comprising elongated elements of the invention can be deployed at greater depth without experiencing elongation percentage possibly harming the overall cable structure.

Also, a length of the elongated elements of the invention is lighter than the same or even shorter length of a comparative elongated element made of metal (steel). This has an advantageous impact, for example, when the cable is deployed by suspension from a vessel.

Example 2

Elongated tensile elements comprising a fibre reinforced polymeric composite core, a metal sheath totally covering the composite core, a substantially rectangular cross section and dimensions of 2 mm×7 mm were bent for obtaining a deformation with a final bending diameter of 60 mm at most.

The strain applied to each element took into account the elongation at break. Such strain was significantly lower than the fibre elongation at break to preserve the integrity of the elongated element core.

TABLE 2

| No. | Composite fibres | Core size (mm) | Fibre elastic modulus (GPa) | Steel % | Applied strain (bending radius) | Final bending radius |
| --- | --- | --- | --- | --- | --- | --- |
| 1 | Carbon | 0.5 × 6 | 150 | 78.5 | 1.2% (20.8 mm) | 27.1 mm |
| 2 | Carbon | 0.75 × 6 | 150 | 68 | 1.7% (22.1 mm) | 29.6 mm |
| 3 | Carbon | 1 × 6 | 150 | 57 | 1.7% (29.4 mm) | 45.1 mm |
| 4 | Aramid | 0.5 × 6 | 100 | 78.5 | 1.2% (20.8 mm) | 27 mm |
| 5 | Aramid | 1 × 6 | 100 | 57 | 2.3% (21.7 mm) | 29.4 mm |
| 6 | Glass | 1 × 6 | 70 | 57 | 2.3% (21.7 mm) | 28.9 mm |
| 7 | Glass | 1.5 × 6 | 70 | 36 | 2.8% (26.8 mm) | 42.7 mm |

Among the elongated tensile elements tested, No. 3 and No. 7 could not be bent with a final bending diameter of 60 mm even by applying a strain near to their elongation at break (1.8% for the carbon fibres of No. 3 and 3% for the glass fibres of No. 7). This means that the elongated tensile elements No. 3 and No. 7 can find an application when bending diameter greater than 60 mm is required at the end-fitting. On the other side, the elongated tensile elements No. 3 and No. 7, when evaluated in the test of Example 1, reached a 0.05% elongation at, respectively, 2,010 m and 1,680 m, lengths greater than, for example, those of elongated tensile elements with a core made of the same fibre reinforced polymeric composite, but comprising a greater amount of steel, for example the elongated tensile elements No. 1 (0.05% elongation at 1,660 m) and No. 6 (0.05% elongation at 1,570 m), respectively.

The selection of the amount of metal (expressed as % of elongated tensile elements cross-section area) within the limit set forth by the invention and the elastic modulus of the fibre reinforced polymeric composite can be selected by the skilled person in view of deployment requirements, such as deposition depths and kind of end-fittings.

The above described tensile elements provide lower weight and better mechanical characteristics than the known tensile members fully made of steel. As a consequence, a submarine cable having an armour comprising tensile elements according to the present invention can be installed in deeper water than known cables with armour comprising elongated tensile members fully made of steel, resulting in the same elongation. In addition, the lower weight of the cable improves handling and transport thereof.

Remarkably, the metal sheath of the above described embodiments allows maintaining use of known techniques and devices for connecting cables together and/or for realizing splices or cable terminations. Such techniques and devices substantially comprise subjecting the armour to a plastic deformation. While a plastic deformation could not be obtained if a fully composite tensile element were adopted, advantageously it can be accomplished with the present invention having a steel sheath at least partially covering the core. This behaviour is advantageous in that the metallic sheath of the tensile element can be plastically deformed in end fittings in order to obtain a strong bond between the end fitting and the cable.

The invention claimed is:
1. A cable comprising:
a cable core;
a protection layer around the cable core;
a plurality of elongated tensile elements around the protection layer, the plurality of elongated tensile elements each having a cross section area and including a fibre reinforced polymer composite core and a sheath at least partially covering the composite core, the fibre reinforced polymer composite core having an elastic modulus of at least 70 GPa, the sheath being made of metal and being at least 30% of the cross section area of the tensile element.

2. The cable of claim 1, wherein the protection layer includes one or more armour layers and the plurality of elongated tensile elements are disposed in the one or more armour layers to provide an armour.

3. The cable of claim 1 wherein the cross section area of the elongated tensile element has a flat shape that includes a first axis and a second axis, the second axis being shorter than the first axis.

4. The cable of claim 3 wherein the fibre reinforced polymeric composite core has a thickness of at most 80% of a thickness of the elongated tensile element.

5. The cable of claim 3 wherein the fibre reinforced polymeric composite core is provided substantially centred at a neutral bending axis of the elongated tensile element.

6. The cable of claim 1, wherein the fibre reinforced polymer composite core comprises one or more of carbon fibres, aramid fibres, glass fibres.

7. The cable of claim 6, wherein the elongated tensile element comprises a carbon fibre reinforced polymer composite core surrounded by an electrically insulating layer.

8. The cable of claim 7, configured for submarine applications.

9. The cable of claim 1, wherein the fibre reinforced polymer composite core comprises a matrix selected from an epoxy matrix or a thermoplastic matrix.

10. The cable of claim 1, wherein the fibre reinforced polymer composite core has a longitudinal axis and fibres embedded in a polymeric matrix, longitudinal axes of the fibres substantially parallel to the longitudinal axis of the fibre reinforced polymer composite core.

11. The cable of claim 1, where the fibre reinforced polymer composite core has an elastic modulus of at least 100 GPa.

12. The cable of claim 1, wherein the sheath is made of steel.

13. The cable of claim 1, wherein the sheath and the fibre reinforced polymer composite core are bounded together by one or more of an adhesive bond or a mechanical bond.

14. The cable of claim 1, wherein the sheath is at most 85% of the cross section area of the tensile element.

15. The cable of claim 1, wherein the elongated tensile element has a substantially rectangular cross section.

16. A pipe comprising:
a carcass; and
a first armour layer and a second armour layer surrounding the carcass, each of the first armour layer and the second armour layer including a plurality of long-pitch helical windings of elongated tensile elements, an elongated tensile element having a cross section area and including a fibre reinforced polymer composite core and a metal sheath at least partially covering the fibre reinforced polymer composite core, the helical windings of the first armour layer extending along a first winding direction, and the helical windings of the second armour layer extending along a second winding direction that is opposite to the first winding direction.

17. The cable pipe of claim 16, wherein the fibre reinforced polymer composite core has an elastic modulus of at least 70 GPa.

18. The pipe of claim 16, wherein the sheath constitutes at least 30% of the cross section area of the elongated tensile element.

19. The pipe of claim 16, wherein the fibre reinforced polymeric composite core is provided substantially centred at a neutral bending axis of the elongated tensile element.

20. The pipe of claim 16, wherein the elongated tensile element has a substantially rectangular cross section.

* * * * *